es Patent Office 2,966,320
Patented Dec. 27, 1960

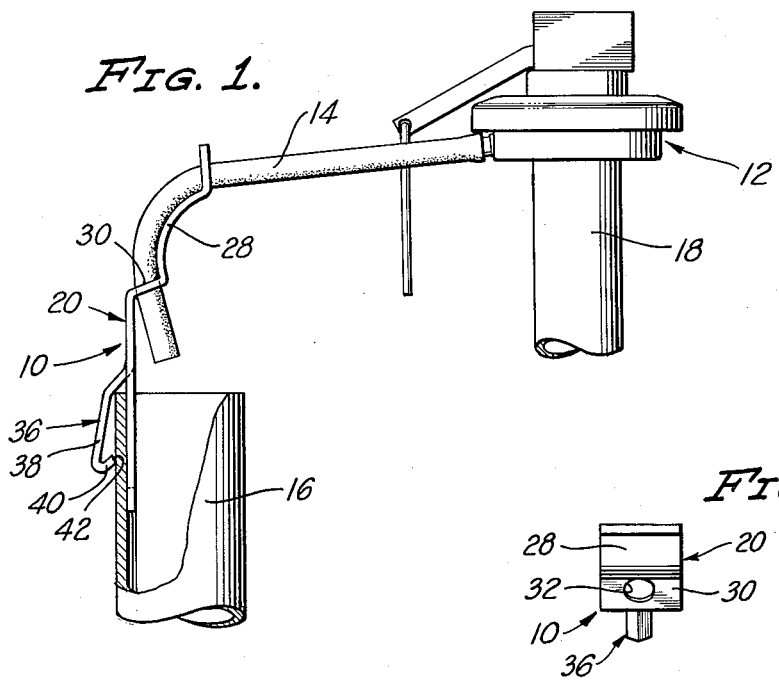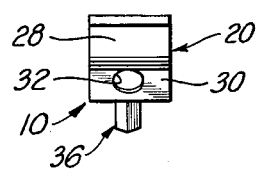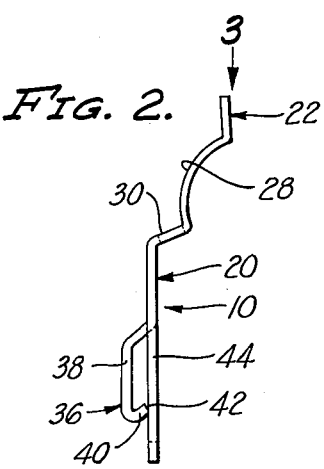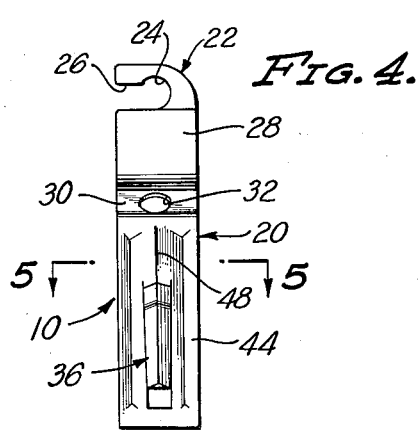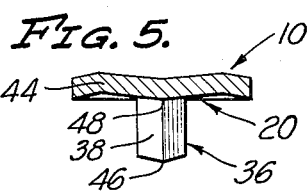

2,966,320

HOSE MOUNTING CLIP

Adolf Schoepe, 1620 N. Raymond Ave., and Orville K. Doyle, 401 E. Las Palmas Drive, both of Fullerton, Calif.

Filed Apr. 6, 1959, Ser. No. 804,262

3 Claims. (Cl. 248—75)

This invention relates to a hose mounting clip and, more particularly, to a hose mounting clip adapted to be mounted within the associated extremity of a pipe to maintain the free extremity of said hose in a predetermined operative relationship with said pipe.

The invention is disclosed as utilized to maintain the free extremity of a flexible hose in operative engagement with the contiguous extremity of an overflow pipe in a toilet flush tank. However, it will be obvious to those skilled in the art that the mounting clip of the invention can be applied with equal cogency in other environments and it is therefore not intended that the use of the invention be limited to the particular environment disclosed herein.

The hose whose free extremity is secured by the mounting clip of our invention has its upper extremity connected in operative relationship with a ball cock which is adapted to permit the ingress of fluid into the interior of a flush tank and the hose serves as a refill hose whereby water is added through the overflow pipe to the bowl of the toilet with which the flush tank is associated. The hose is formed from neoprene or similar flexible material and, as water under pressure flows therethrough, its normal tendency is to whip or swing about thus causing dislodgement of said free extremity from operative engagement with the overflow pipe.

It is, therefore, an object of the invention to provide a hose mounting clip which is adapted to securely mount the free end of said hose in operative engagement with the associated overflow pipe so that, as water flows through the hose, the hose will be maintained securely upon the contiguous extremity of the pipe.

Another object of the invention is the provision in a mounting clip of the aforementioned character of means whereby the longitudinal axis of the hose extremity is caused to diverge from the longitudinal axis of the overflow pipe in order that the stream of water issuing therefrom will be discharged against the inner wall of the overflow pipe immediately adjacent the free extremity of the hose in order to prevent the creation of noise which would occur if the discharge of fluid from the hose termited at the bottom of the overflow pipe.

Another object of the invention is the provision of a hose mounting clip of the aforementioned character wherein the lower extremity of the clip is provided with a gripping member adapted to impinge upon the perimeter of the pipe and to grip the said perimeter more effectively as the axial thrust induced in the clip increases because of the jet action of fluid flow from the end of the associated hose.

Another object of the invention is the provision of a hose mounting clip of the aforementioned character which includes hose gripping means adapted to engage upon the perimeter of the hose and to maintain said hose against dislodgement from said clip.

Another object of the invention is the provision of a hose mounting clip of the aforementioned character in which the hose can be quickly located and which can, in turn, be quickly and easily secured to the associated extremity of a pipe.

Other objects and advantages of the invention will be apparent from the following specification and the accompanying drawing, which is for the purpose of illustration only and in which:

Fig. 1 is a fragmentary, side elevational view showing a hose mounting clip constructed in accordance with the teachings of the invention supporting the free extremity of a flexible hose in operative engagement with the associated extremity of a contiguous overflow pipe;

Fig. 2 is a side elevational view of the mounting clip;

Fig. 3 is a top plan view of the upper extremity of the mounting clip taken from the direction of the arrow 3 of Fig. 2;

Fig. 4 is a front elevational view of the mounting clip; and

Fig. 5 is a transverse, sectional view taken on the broken line 5—5 of Fig. 4.

Referring to the drawing, we show a mounting clip 10 constructed in accordance with the teachings of the invention and adapted to be utilized in conjunction with a ball cock 12 to maintain the refill hose 14 associated therewith in operative engagement with the contiguous extremity of an overflow pipe 16, all of the above mentioned components being disposed within the confines of a conventional toilet flush tank, not shown, to control the ingress of fluid into said tank and to partially control the egress of fluid therefrom.

The details of construction of the ball cock 12 constitute no part of the disclosure of the invention and are shown in co-pending application, Serial No. 607,857, filed September 4, 1956 and entitled "Flush Tank Valve," now Patent 2,911,000. The hose 14 is formed from neoprene or other flexible material and is adapted to have its upper extremity securely connected to a water refill outlet of the ball cock 12, while the lower free extremity of said hose is adapted to be mounted in operative engagement with the contiguous extremity of the overflow pipe 16 in order to permit refill water to flow into said overflow pipe.

If the lower extremity of the refill hose 14 is merely located in the contiguous extremity of the overflow pipe 16, it will be dislodged from operative engagement therewith during the flow of water therethrough since the hydraulic action of the water will cause the lower extremity of the hose 14 to whip about and thus dislodge it from operative engagement with the overflow pipe 16. In addition, if the free end of the refill hose 14 is permitted to depend into the overflow pipe 16 below the fluid level of the water in the flush tank, not shown, it may siphon said water through the outlet pipe 18 associated with the ball cock 12 and discharge it into the overflow pipe 16, thus reducing the level of the water in the flush tank and causing consequent waste of water and unnecessary ball cock operation.

In order to overcome these undesirable consequences of locating the free extremity of the refill hose 14 in the overflow pipe 16 without any positive securement thereto the mounting clip 10 is provided, said mounting clip being constituted by an elongated body 20 formed from stainless steel sheet metal or the like. The body 20 incorporates hose gripping means 22 in its upper extremity, said hose gripping means being constituted by a transversely oriented open-ended slot 24 having a reduced throat 26 adapted to serve as a hose detent and an enlarged inner extremity of semi-circular configuration conforming generally to the outside diameter of the hose 14.

Formed in the body 20 of the mounting clip 10 is a curvilinear, orienting portion 28 which is located adjacent the hose gripping means 22 and which terminates in an angularly oriented land 30 having a centrally located orifice 32 therein through which the hose 14 is adapted to be inserted.

Formed integrally with the lower extremity of the clip 10 is pipe gripping means 36 constituted by a hook member 38 having an upwardly bent extremity 40 whose end 42 is angularly inclined to clause it to engage the perimeter of the overflow pipe 16 in a direction adapting it to resist axial and upward dislodgement of the clip 10 by the jet effect of water flow through the hose 14. The adjacent portion of the lower extremity of the clip 10 serves as a mounting leg 44 adapted to engage the inner wall of the pipe 16 to cooperate with the hook member 38 in maintaining the hose 14 in predetermined operative relationship with said pipe.

It will be noted that the hook member 38 has its depending portion angularly bent in transverse cross section, as at 46, to rigidify said hook member and the leg 44 of the mounting clip 10 is similarly provided with a rigidifying rib 48.

In utilizing the mounting clip 10 to properly locate the lower extremity of the hose 14 with reference to the contiguous extremity of the pipe 16 the free end of the hose 14 is first inserted through the orifice 32 in the angularly oriented land 30 and the lower extremity of the hose 14 is adjusted with respect to the lower extremity of the leg 44. After this relationship has been determined the body of the hose 14 is inserted laterally through the reduced throat 26 of the slot 24 and ultimtaely located in the enlarged portion of the slot 24. When so located dislodgement of the hose from the slot 24 is prevented since the reduced throat 26 of the slot serves as a detent preventing lateral displacement of the hose therefrom.

After the mounting clip 10 has been thus inserted in operative engagement with the hose 14 the lower extremity thereof may be secured upon the upper extremity of the overflow pipe 16. This is accomplished by inserting the mounting leg 44 in the upper extremity of the overflow pipe 16 and then pushing the upwardly bent extremity 40 of the hook member 38 against the extreme end of the overflow pipe 16 which will cause the hook member 38 to splay outwardly into the position shown in Fig. 1 of the drawing, thus permitting the clip 10 to be urged downwardly until the extreme upper end of the overflow pipe 16 is juxtaposed to the junction between the body 20 of the clip 10 and the hook member 38.

When so located on the pipe 16, the mounting clip 10 maintains the lower extremity of the refill hose 14 above the water level in the surrounding flush tank, not shown, to prevent the siphoning of water from the flush tank, through the refill hose and out the overflow pipe 16. Moreover, the orienting portion 28 of the clip 10 angularly orients the lower extremity of the hose 14 so that the stream of water issuing therefrom impinges on the inner wall of the overflow pipe 16 eliminating the noise which would result if the axes of the refill hose 14 and the overflow pipe 16 were parallel and the water from the refill hose were discharged downwardly to the lower extremity of the overflow pipe 16. Of course, the radius of the curvilinear orienting portion 28 of the clip 10 is the determining factor as to the extent of angular divergence of the longitudinal axis of the hose 14 from the longitudinal axis of the overflow pipe 16.

The angle of divergence of the axis of the refill hose 14 from that of the overflow pipe 16 may be, and preferably is, more acute than that shown in the drawing so that the point of impingement of the stream of water on the inner wall of said pipe will be located as close to the upper extremity of said pipe as possible.

The relatively long mounting leg 44 of the clip 10 disposed in contact with the inner wall of the overflow pipe 16 and the inward bias of the hook member 38 function to prevent cocking of the clip 10 with respect to the pipe 16. In addition, the extreme end 42 of the upwardly bent extremity 40 of the hook member 38 will bite into the adjacent portion of the exterior wall of the overflow pipe 16 and resist axial dislodgement of the mounting clip 10 from operative engagement with the pipe 16. Therefore, if the jet action of water flowing from the hose 14 imposes an upward axial thrust upon the mounting clip 10, axial movement of the mounting clip 10 is resisted by the positive engagement of the hook member 38 on the pipe 16.

Angularly bending the hook member 38 transversely of its length in the manner shown in Figs. 4 and 5 of the drawing materially rigidifies the hook member 38 and prevents inadvertent deformation thereof. Similarly, the rigidifying rib 48 formed in the leg 44 of the clip 10 materially strengthens said leg and causes it to effectively cooperate with the hook member 38 to provide an adequate bearing on the upper extremity of the pipe 16.

There is thus provided by the invention a one-piece mounting clip which can be readily engaged with the overflow pipe 16 and the associated extremity of the refill hose. The clip serves both to accurately position the associated extremity of the refill hose 14 and to orient it angularly for effective and relatively noiseless discharge of water therefrom. In addition, the manual bending and manipulation of prior art mounting means is eliminated by the utilization of the mounting clip of the invention.

The rigidification of the mounting clip by providing the stiffening ribs therein permits lighter gage material to be utilized with resultant economy in material cost. In addition, the deflectable parts such as the hook member are more easily deflected to permit the mounting of the clip on an associated object and, since the likelihood of permanent set is reduced, the spring tension is more adequately maintained. Therefore, the clip can be mounted on pipes, conduits and containers of widely different wall thicknesses.

The use of the mounting clip is not limited to pipes since it will serve as an anti-siphon connection between the end of any fluid conduit and an associated vessel.

We claim:

1. A hose mounting clip for securing the free end of a hose in predetermined relationship to an adjacent extremity of an associated pipe including, a unitary body, said body having a vertically oriented upper extremity incorporating hose gripping and receiving means, said hose gripping and receiving means being constituted by an elongated open ended slot having a detent portion formed at one edge thereof for restraining said free end of said hose from displacement therefrom, said body having a substantially horizontal portion incorporating a hose receiving aperture therein and said body having pipe gripping means at its lower extremity and having hose orienting means intermediate said upper extremity and horizontal portion whereby the longitudinal axis of said hose is angularly oriented with respect to the longitudinal axis of said pipe.

2. A hose mounting clip adapted to maintain the free end of a flexible hose in operative engagement with the contiguous extremity of an associated pipe including, an elongated, unitary body having a vertically oriented upper extremity incorporating a transversely oriented hose receiving slot and a curvilinear portion adjacent said slot adapted to bend said hose on a predetermined radius, said body having a substantially horizontal portion immediately below said curvilinear portion incorporating an aperture for the reception of said hose and a pipe gripping member on said body adjacent the lower extremity thereof for engagement with the contiguous extremity of said pipe.

3. A hose mounting clip adapted to maintain the free end of a flexible hose in operative engagement with the contiguous extremity of an associated pipe including, an elongated, unitary body having a vertically oriented upper extremity incorporating transversely oriented hose receiving slot and a curvilinear portion adjacent said slot adapted to bend said hose on a predetermined radius, said body having a substantially horizontal portion immediately below said curvilinear portion incorporating an aperture for the reception of said hose and a pipe gripping member on said body adjacent the lower extremity thereof for engagement with the contiguous extremity of said pipe, said pipe gripping member including a hook member deformed outwardly of the plane of the associated extremity of said body and adapted to impinge upon the associated surface of said pipe.

References Cited in the file of this patent

UNITED STATES PATENTS

| | | |
|---|---|---|
| 2,070,495 | Strutz | Feb. 9, 1937 |
| 2,189,364 | Kirsten | Feb. 6, 1940 |
| 2,743,459 | Schmidt | May 1, 1956 |
| 2,855,107 | Roth | Oct. 7, 1958 |